May 29, 1956 C. J. BOWERMAN 2,747,464
FINE ADJUSTMENT MEANS FOR MICROSCOPES
Filed Feb. 19, 1954
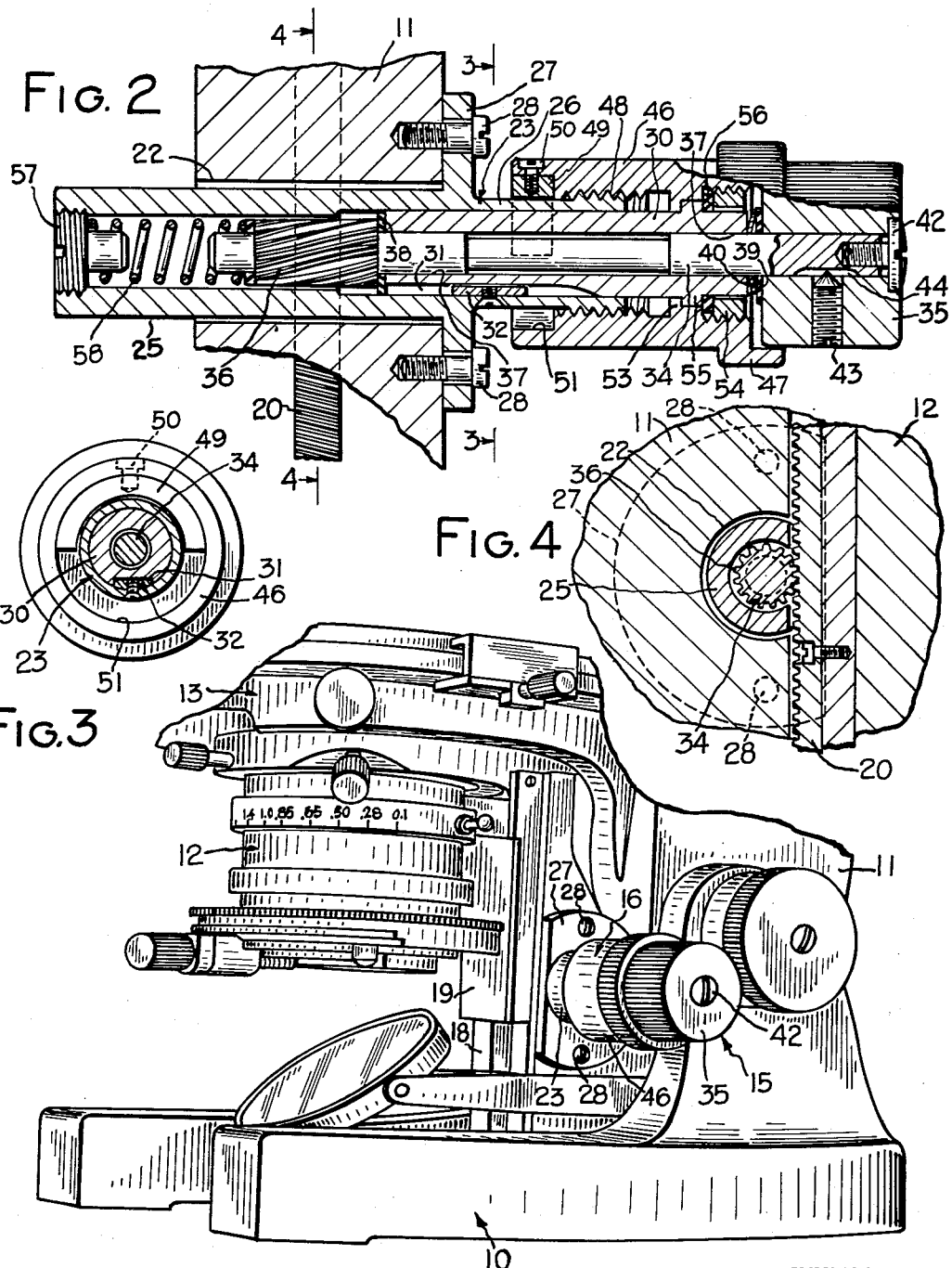
INVENTOR.
CLARENCE J. BOWERMAN
BY  G. A. Ellestad
ATTORNEY.

United States Patent Office 2,747,464
Patented May 29, 1956

2,747,464

FINE ADJUSTMENT MEANS FOR MICROSCOPES

Clarence J. Bowerman, Pittsford, N. Y., assignor to Bausch & Lomb Optical Company, Rochester, N. Y., a corporation of New York Application February 19, 1954, Serial No. 411,322

4 Claims. (Cl. 88—39)

This invention relates to microscopes and more particularly to a fine adjustment mechanism therefor.

One of the objects of this invention is to provide an improved fine adjusting mechanism which is relatively simple in structure, neat in appearance, economical to manufacture and yet efficient in operation.

Another object of this invention is to provide an improved fine adjusting mechanism which is coaxially mounted relative to the coarse adjusting mechanism.

A further object of this invention is to provide an improved fine adjusting mechanism having an actuating knob so arranged relative to the microscope and to the coarse adjusting mechanism as to afford a maximum of convenience and comfort to the user.

These and other objects and advantages reside in certain novel features of construction, arrangement and combination of parts as will hereinafter be more fully described and pointed out in the appended claims.

Referring to the drawings:

Fig. 1 is a fragmentary view of a microscope stand showing a preferred form of the invention embodied therein.

Fig. 2 is a fragmentary vertical section of the coarse and fine adjustment mechanism.

Fig. 3 is a section taken on line 3—3 of Fig. 2.

Fig. 4 is a section taken on line 4—4 of Fig. 2.

One embodiment of my invention is illustrated in the drawing wherein 10 designates a base having an upstanding support 11 which has a vertically movable substage condenser lens member 12 aligned with a specimen stage member 13. Although the preferred form of my invention is shown with a coarse adjusting mechanism 15 and a fine adjusting mechanism 16 for moving the substage condenser lens member 12, it is to be understood that said adjusting mechanisms 15 and 16 could be used for adjusting a movable specimen stage or a movable lens carrying body tube member without departing from the spirit of my invention. The substage condenser lens member 12, slidably mounted on slideways 18 and 19 for focusing purposes, has attached on one side thereof a rack 20 adapted to move vertically with said condenser lens member 12.

Mounted on the support 11 and extending through an opening 22 therein is an elongated tubular housing 23 having intermediate its end portions, 25 and 26, a flange member 27 through which screws 28 pass into threaded engagement with the support 11 for holding the adjusting mechanisms 15 and 16 in operative position relative to the rack 20. Slidably mounted coaxial with and having a portion thereof extending into the housing 23 is a cylindrical sliding member or sleeve 30 which has a longitudinal keyway 31 in an outer wall in engaging relation with a key 32 mounted on the inside wall of the housing 23, said key 32 and keyway 31 permitting said sleeve 30 to slide axially relative to the housing 23. Coaxially mounted within said sleeve 30 to move axially therewith and rotate relative thereto is a shaft 34 which has a coarse adjusting knob 35 mounted on one end portion and has a helical pinion 36 mounted thereon adjacent the other end portion, said pinion 36 being in operative engagement with said rack 20 so that rotation of the knob 35 will rotate the pinion 36 to effect coarse adjustment of the condenser lens member 12.

The shaft 34 has two bearing surfaces 37 which rotate freely on the bearing surfaces on the sleeve 30 for supporting said shaft relative to said housing. Nylon washers 38 and 39 are mounted on the shaft 34 and are positioned, respectively, between one end of the sleeve 30 and pinion 36 and between knob 35 and a spring washer 40, said spring washer 40 bearing against the other end of the sleeve 30. The knob 35 may be shifted axially of the shaft 34 to any selected position by turning an adjusting screw 42 in the end of the shaft 34. A lock screw 43 is threaded in the knob 35 into engaging relation with a slot 44 in the side of the shaft 34 for locking the knob 35 on the shaft 34 in the selected position.

Advancing said screw 42 compresses the spring washer 40 against the sleeve 30 for increasing the amount of drag between the knob 35 and the sleeve 30 to provide resistance against the rotation of the pinion 36. This drag between the sleeve 30, knob 35 and pinion 36 prevents the pinion 36 from rotating relative to the sleeve during certain operations of the device for a purpose to be explained hereinbelow. Also, this aforementioned resistance or drag prevents the weight of the condenser lens member 12 from turning the pinion and upsetting the adjusted position of said lens member.

The fine adjustment of the condenser lens member 12 is accomplished by axially shifting said pinion 36, shaft 34, sleeve 30 and knob 35 relative to the housing 23 to thereby cause the teeth on the pinion 36 to move across the teeth on the rack 20 and by a camming action to raise or lower the condenser lens member 12 an amount less than the pitch of said teeth on the pinion 36. The inside portion of the housing 23 in the vicinity of the pinion 36 is large enough to permit the pinion 36 to be freely shifted axially an amount equal at least to twice the length of said pinion 36. An actuating means or tubular knob 46, having an undercut portion 47 for telescopically fitting over the knob 35, is coaxially mounted relative to the sleeve 30 and shaft 34 and is in threaded engagement with the threads 48 on the outside of the projecting end portion 26 of the housing 23. The inner end portion of the tubular knob 46 has a semi-circular stop 49, seated by screw 50 in an undercut portion 51, which prevents the tubular knob 46 from being moved axially too far in either direction.

The inner surface of the tubular knob 46 has a pair of axially spaced inwardly projecting radial shoulders 53, 54 which extend into operative engagement, respectively, with the opposite sides of a radial projection 55 integrally formed on the outer surface of said sleeve 30. The shoulder 53 is formed integrally with the tubular knob 46 while the shoulder 54 is threaded into the end of said tubular knob 46. Shoulder 54 forces a nylon washer 56 against the side of the radial projection 55 to provide a freely sliding surface between the rotating shoulders 53, 54 and the non-rotating axially slidable radial projection 55 on sleeve 30. Mounted in the end portion 25 of the housing 23 by means of a threaded plug 57 is a spiral spring member 58 which is in engagement with the adjacent end of the pinion 36 whereby said spring 58 urges said pinion and adjusting mechanisms in the one direction to substantially eliminate slack and backlash from the mechanisms.

Rotation of the tubular knob 46 will move said tubular knob axially of the housing 23 along the threads 48 on said housing. As the tubular knob 46 moves axially, the pair of shoulders 53 and 54 in engagement with the radial projection 55 on said sleeve transmit the axial movement of the tubular knob to the sleeve 30, shaft 34, and pinion 36. The axial movement of the pinion 36 relative to the housing 23 will slide the teeth on said pinion transversely across the rack 20 for raising or lowering the condenser lens member 12 an amount less than the width of the pinion times the tangent of the pitch angle of the teeth on said pinion 36.

In the operation of my invention, the coarse adjusting knob 35 is rotated against the resistance created by the spring washer 40 to effect coarse adjustment of the condenser lens member 12 relative to the support. To effect fine adjustment of said condenser lens member 12, the tubular knob 46 is rotated. Since the key 32 engages in the longitudinal keyway 31 to constrain the sleeve 30 to rectilinear movement axially of the sleeve 30, the rotation of the tubular knob 46 will cause the sleeve 30 to move axially thereof. The sleeve 30 is mounted on the shaft 34 and pinion 36 in such a way that movement of the sleeve 30 axially in either direction will simultaneously move the shaft 34 and pinion 36 axially therewith. The movement of the pinion 36 transversely across the rack 20 will raise or lower the condenser lens member 12 a relatively small amount. It is imperative for the successful operation of the fine adjusting mechanism that the shaft does not rotate during the axial shifting of the sleeve. When the tubular knob 46 is rotated, the shaft 34 and pinion 36 will be held against rotation by the drag exerted on the pinion 36 and sleeve 30 by the spring washer 40. The drag maintained by the spring washer 40 is always sufficient to prevent the pinion 36 from rotating when the tubular knob 46 is rotated.

From the foregoing, it will be apparent that I am able to attain the objects of my invention and provide improved means whereby fine adjustments of a microscope may be effected. My improved means is relatively simple in structure requiring no difficult machining operations to produce the parts thereof. The resulting mechanism provides a device that is neat in appearance and is mounted on the microscope in such a way as to be easily manipulated with one hand of the operator. The mechanism is economical to manufacture and efficient and accurate in operation. Various modifications of structure can, of course, be made without departing from the spirit of my invention as pointed out in the appended claims.

I claim:

1. In a microscope the combination of a support, a lens member slidably mounted on said support, a tubular housing extending through said support, a rack carried by said member, a shaft mounted for rotational and axial movement within said housing, a helical pinion fixed on the shaft adjacent one end thereof and in operative engagement with the rack, a knob fastened on the other end of the shaft for rotating the pinion to effect coarse adjustment of said member, a sliding member positioned within the housing and extending parallel to the shaft, one end of the sliding member being connected to one end of the pinion whereby motion of the sliding member will be transmitted to the pinion, means on said sliding member and said housing for limiting the sliding member to longitudinal movement relative to the housing, a tubular knob coaxially mounted relative to said shaft and in threaded engagement with the outside of said tubular housing, coacting means on said tubular knob and said sliding member for transmitting the axial movement of the tubular knob to the sliding member, and frictional drag means acting on the sliding member and the shaft to provide resistance against rotation of the pinion whereby rotation of the tubular knob will move the pinion transversely relative to the rack for effecting fine adjustment of the lens member.

2. In a microscope the combination of a support carrying a lens member and a stage member and having at least one of said members movable relative to the other, a tubular housing on said support, a rack carried by said movable member, a shaft mounted for rotational and axial movement within said housing, helical gear means fastened on said shaft adjacent one end portion for operatively connecting the shaft to the rack, a knob fastened on the other end portion of the shaft for rotating said shaft to effect coarse adjustments of the movable member, and means for moving the pinion axially to effect fine adjustments of the movable member, said last-named means comprising a sleeve rotatably and coaxially mounted relative to said shaft and having a portion thereof slidably mounted in said housing, yieldable means for holding said sleeve in abutting engagement with said pinion to provide resistance against rotation of said pinion, said sleeve having a longitudinal keyway in the outer wall thereof, a key mounted on the inside wall of said housing in engagement with said keyway to permit axial movement of said sleeve, said shaft being rotatable relative to and axially movable with said sleeve, a tubular knob coaxially mounted relative to said shaft and sleeve and in threaded engagement with the outside of said tubular housing, and coacting means on said tubular knob and said sleeve for transmitting the axial movement of the tubular knob to the sleeve whereby rotation of the tubular knob will move the pinion transversely relative to the rack to effect fine adjustment of the movable member.

3. In a microscope the combination of a support, a lens member slidably mounted on said support, a tubular housing extending through said support, a sleeve having a portion slidably mounted within said housing and having a longitudinal keyway in the outer wall thereof, a key mounted on the inside of the tubular housing in engagement with said keyway, a shaft coaxially mounted in said sleeve to move axially therewith and rotate relative thereto, a helical pinion and a coarse adjusting knob fastened on opposite ends of said shaft, yieldable means for holding said sleeve in abutting engagement with said pinion to provide resistance against the rotation of said pinion, a rack carried by said lens member in operative engagement with said pinion, a tubular knob in threaded engagement with the outer portion of said housing and coaxially mounted relative to said sleeve and said shaft, a radial projection formed on the outer surface of said sleeve, and a pair of spaced inwardly projecting shoulders formed on the inner surface of the tubular knob in operative engagement, respectively, with the opposite sides of said radial projection, whereby rotation of the coarse adjusting knob will rotate the pinion relative to the rack for raising or lowering the lens member in relatively large increments, and rotation of the tubular knob will move the pinion transversely relative to the rack so that said lens member will be raised or lowered an amount less than the width of said pinion times the tangent of the pitch angle of said pinion to effect fine adjustment thereof.

4. In a microscope the combination of a support, a lens member slidably mounted on said support, a tubular housing extending through said support, a sleeve having a portion thereof slidably mounted within the housing and coaxial therewith, said sleeve having a longitudinal keyway in the outer wall thereof, a key mounted on the inside of the tubular housing in engaging relation with said keyway, a shaft rotatably mounted within said sleeve on bearing surfaces formed on the sleeve, said shaft being coaxial with the sleeve and mounted to move axially therewith, a helical pinion fastened adjacent one end of the shaft, a rack carried by said lens member in operative engagement with said pinion, a knob on the other end of the shaft for rotating the shaft to effect coarse adjustment of the lens member, a spring washer on said shaft between the knob and the sleeve for urging said sleeve into abutting relation with one end of said pinion to provide resistance against the rotation of said pinion, a spring member positioned within said housing in engagement with the other end of said pinion, a tubular knob coaxially mounted relative to said shaft and sleeve and in threaded engagement with the outside of said tubular housing, a radial projection integrally formed on the outer surface of said sleeve, and a pair of inwardly projecting spaced shoulders carried by the tube and in engagement, respectively, with the opposite sides of said radial projection, whereby rotation of the tube will move the pinion transversely of the rack for effecting fine adjustment of the lens member.

References Cited in the file of this patent

UNITED STATES PATENTS

| | | |
|---|---|---|
| 528,211 | Sedgwick | Oct. 30, 1894 |
| 2,421,126 | Ott | May 27, 1947 |
| 2,563,702 | Benford | Aug. 7, 1951 |